Oct. 9, 1928.

A. C. McWILLIAMS 1,686,717

METERING PANEL BOARD

Filed May 9, 1921

Inventor:
Arthur C. McWilliams
by Albert Scheible
Attorney

Oct. 9, 1928.
A. C. McWILLIAMS
1,686,717
METERING PANEL BOARD
Filed May 9, 1921   3 Sheets-Sheet 2
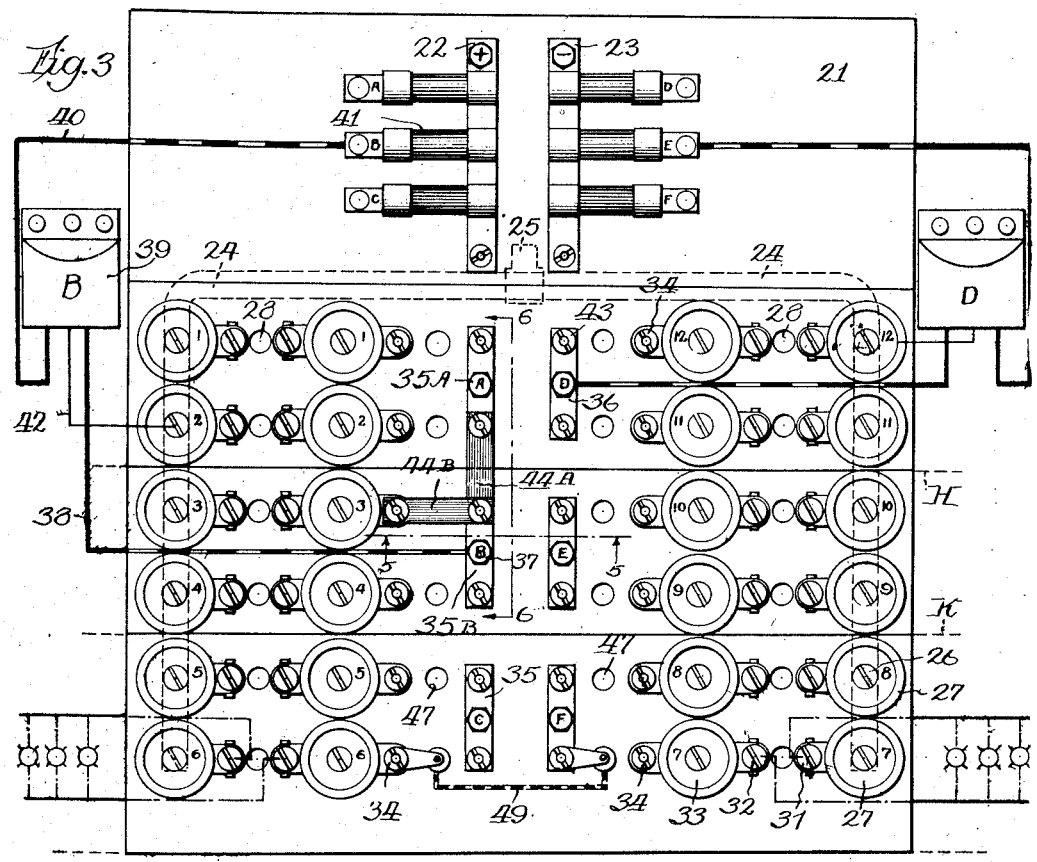
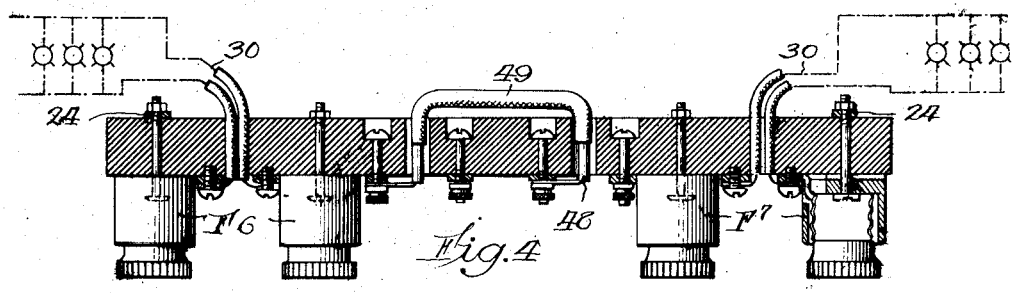

Oct. 9, 1928.

A. C. McWILLIAMS

METERING PANEL BOARD

Filed May 9, 1921    3 Sheets-Sheet 3

1,686,717

Inventor:
Arthur C. McWilliams
by Albert Scheible
   Attorney

Patented Oct. 9, 1928.

1,686,717

UNITED STATES PATENT OFFICE.

ARTHUR C. McWILLIAMS, OF CHICAGO, ILLINOIS, ASSIGNOR TO WESTINGHOUSE ELECTRIC & MANUFACTURING COMPANY, A CORPORATION OF PENNSYLVANIA.

METERING PANEL BOARD.

Application filed May 9, 1921. Serial No. 467,801.

My invention relates to metering panel boards, its general objects being those of providing simple, inexpensive, compact, and easily installed panel boards arranged for facilitating the connection of consumption circuits to meters in any desired combinations. In buildings in which space is rented out to different tenants in varying proportions, it is a common practice to meter the current consumed by each tenant for his electric light and fan service, and it is therefore necessary to regroup the metering connections whenever the space occupied by different tenants of the building is increased or decreased. For this purpose, it is customary to provide a separate meter for each tenant and to mount the consumption circuit terminals for a group of rooms (such as the rooms on a single floor of a building) on a metering panel board from which the connections can then be made in any desired combinations to the meters.

Various metering panel boards have heretofore been devised and employed for this purpose, such as the ones described in my previously issued Patent No. 920,490, which shows a panel board in which the consumption circuit conductors extend transversely across the meter circuit conductors, thus permitting any desired connections to be made between the two sets of conductors. While such an arrangement is highly advantageous, it requires the use of conductors of ample length for simultaneously affording all of the possible connections and hence involves a rather high cost in proportion to the average needs, since only a small portion of the said conductors is ordinarily in service. It also requires a larger amount of wall space than is desirable, particularly in modern buildings where the rental value of space is quite high. The same objections also apply to panel boards in which the connections are made through transfer bars disposed at the sides of the board and requiring long straps for the connections to the same. My present invention aims to overcome such objections by providing a simplified and cheapened construction which also will occupy considerably less wall space than a crossed-conductor panel board of the type above mentioned.

Other types of panel boards have also been objectionable in that they presented consumption circuit terminals of opposite polarity close to each other and therefore made it difficult for the electrician employed in renewing fuses or in changing connections to avoid short-circuits. My invention aims to overcome this objection by providing a polarity type of panel board in which the consumption circuit terminals of each polarity are grouped by themselves and are spaced by considerable distances from those of the opposite polarity. Moreover, my present invention aims to provide a panel board in which the fuses for both terminals of each consumption circuit are mounted on the panel board adjacent to each other so as to be easily distinguished from other fuses, and to provide a metering panel board in which such an arrangement will permit a considerable reduction in the wall space required for the board. It also aims to make the ordinary meter connections to the terminals of the two polarities instantly visible, thereby enabling the electrician to tell at a glance how nearly he is balancing the connections and hence facilitating the proper balancing of the load on an ordinary three wire system.

In still another aspect, my invention aims to provide a metering panel board in which the connections for the more common groupings can be all made by employing relatively short and cheap strap conductors and preferably by employing strap conductors of a standard size; and also to arrange the panel board so that unusual connections can quickly be made by means of jumpers of insulated wire or the like.

Furthermore, my invention aims to provide a panel board construction which can readily be built in sections and in which the constituent sections can speedily be connected to one another, and aims to provide a panel board in which both the above described usual and unusual connections can readily be made without employing loose or unsightly conductors and without the risk of short-circuits between such conductors. It also aims to provide a metering panel board in which all the consumption terminals of each polarity can easily be connected to each other whenever no separate metering of different circuits is required. Still further and also more detailed objects will appear from the following specification and from the accompanying drawings, in which Fig. 1 shows a meter closet as installed in a typical office building for use according to my invention.

Fig. 3 is an enlarged elevation of a panel board embodying my invention, such as the one within the closet of Figs. 1 and 2, and arranged for connecting twelve consumption circuits in any desired combinations with from one to six meters.

Fig. 4 is a horizontal section through the same board, taken along the center line of the lower row of fuses.

Fig. 5 is a fragmentary horizontal section taken along the correspondingly numbered line in Fig. 3.

Fig. 6 is a fragmentary vertical section taken along the correspondingly numbered line in Fig. 3 and showing one standard strap connector as used for electrically connecting two of the meter bars.

Fig. 7 is a plan view of one of the rear wire terminals used in combination with a short length of insulated wire for making one of the unusual connections on the panel board, such as the one shown in heavy dotted lines near the lower edge of Fig. 3 and also shown in elevation at the middle of Fig. 4.

Fig. 8 is an elevation of the same rear wire terminal.

Fig. 9 is a plan view of one of the standard strap connectors as used with the panel board of Fig. 3 in making all ordinary connections between the meter bars and consumption circuit terminals.

Figure 2:
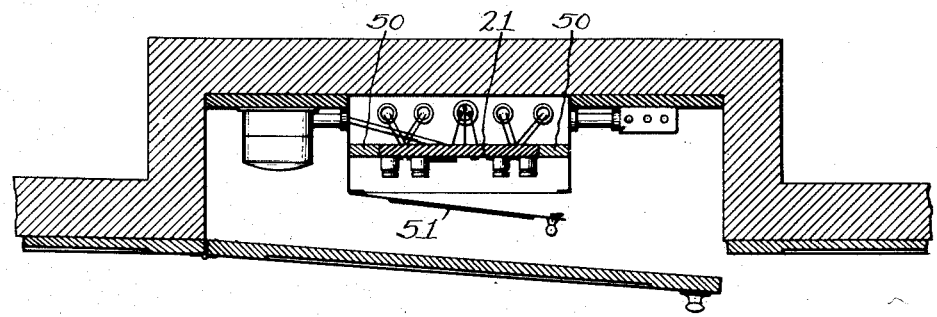
Fig. 2 is a horizontal section through the meter closet of Fig. 1.

Referring to the illustrated embodiment, Fig. 3 shows a metering panel board having as its insulating base a panel 21 of slate carrying upon its front bus bars 22 and 23 adapted to be connected respectively to the positive and negative sides of an ordinary three wire current supply circuit and having mounted on its rear a bus bar 24 connected to a lug 25 through which the current supply connection is made to the neutral wire of the circuit. This neutral bus bar 24 is desirably substantially U-shaped, with its two arms extending adjacent to the opposite lateral edges of the board behind bores in the board through which connections are made by bolts 26 to fuse plugs for the neutral side of the various consumption circuits. These fuse plugs are here shown as of the screw type, with the plugs omitted in Fig. 3 but included in the section of Fig. 4. Laterally inward of the two vertical rows of fuse plugs as thus disposed adjacent to the opposite edges of the panel board are two rows of bores 28 through which the consumption circuit wires 30 are brought from the back of the board to the terminals 31 of the said fuse plugs 27 and also to the terminals 32 of the fuse plugs 33 each of which respectively protects the polarity side of the same circuit for which the neutral side is protected by the laterally adjacent fuse plug 27. These polarity side fuse plugs 33 are desirably also disposed in two vertical rows laterally inward of the board from the bores 28 and desirably have the consecutive fuse plugs in each row spaced from each other by the same distances as the consecutive fuse plugs 27, namely by the standard center-to-center distance for which the standardized connectors of my panel board are made. The polarity fuse side fuse plugs 33 of the consumption circuits have their other terminals 34 (namely the terminals which are to be connected to the polarity side of the meter supply circuit) directed towards the middle of the panel board.

Thus arranged, it will be obvious from Fig. 3 that the protective instrumentalities (here shown as pairs of fuse plugs) associated with the respective consumption circuits are disposed in horizontal rows with their metering terminals 34 directed towards the vertical center line of the panel board. Mounted on the face of the panel board between these two rows of terminals 34 are a plurality of rows of meter bars, which rows are also spaced from each other by the center-to-center distance above mentioned. Generally, I employ two rows of metering bars for this purpose as shown in Fig. 3, these rows of bars 35 and 36 being respectively in alinement with the bus bars 22 and 23 which are respectively connected to the positive and negative sides of the supply circuit. Each of the meter bars is provided with a wire terminal 37 through which one of the polarity connections may be made to a meter, while the other polarity connections to the same meter is made through a fuse to one of the bus bars. For example, Figs. 3 and 6 show the middle meter bar 35B as connected through a wire 38 to one side of the meter 39, while the other side of the meter is connected through a wire 40 and a fuse 41 to the bus bar 22, the neutral connection for the same meter being made by a wire 42 to the neutral bus bar 24 at the back of the panel board.

Each of the meter bars is also provided with a plurality of wire terminals 43 respectively in horizontal alinement with the fuse plug terminals 34 and spaced from the latter by the above named standard center-to-center distance. Ordinarily, I employ meter bars 36 each of a sufficient length for providing two such terminals 43 and hence adapted to be directly connected to two of the consumption circuits. Thus arranged, it will be obvious from the right hand half of Fig. 3 that by bridging across the laterally adjacent terminals 43 and 34, each of the three right hand meter bars 36 can readily be connected to a pair of consumption circuits.

Figure 10:
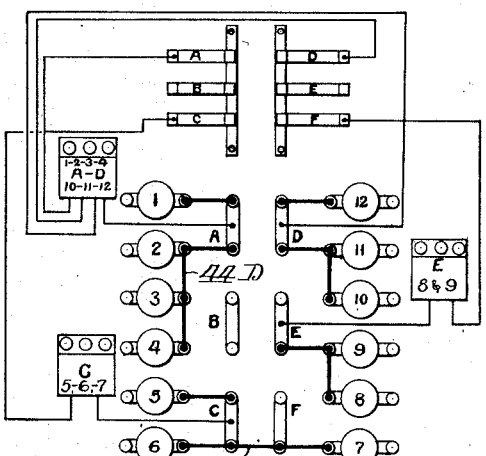
Fig. 10 is a diagrammatic view of the panel board of Fig. 3 showing twelve circuits as connected in certain groupings to three meters, all of the changeable connections being made by means of the standardized strap connectors, one of which was shown in Fig. 9, the two outer rows of fuses being omitted.

For making such connections, as well as the other connections hereafter mentioned, I desirably employ strap connectors 44 consisting simply of metal strips of approximately the same length as the meter bars and punched with bores to correspond to the said center-to-center standard spacing as shown in Figs. 5 and 9. In view of this standardized spacing between adjacent terminals associated with the consumption circuits and the meter bars, these standard strip connectors can be used interchangeably as totalizers for connecting any meter bar with another meter bar in the same row (as shown at 44A in Fig. 3) or as circuit connectors connecting any meter bar with a consumption circuit terminal adjacent thereto (as shown at 44B in the same figure) or as transfer connectors for connecting the meter bar in one row with a meter bar in the other row as shown in 44C in Fig. 11. The same standardized straps can likewise be used as totalizers for connecting any two circuit terminals in the same row, as shown at 44D in Fig. 10.

By thus standardizing the spacing between the terminals which ordinarily are connected, and by using corresponding standard strap connectors, I can therefore connect the consumption circuit terminals in a wide variety of groupings to the several meters. For instance, Fig. 3 shows a strap 44B connecting room circuit #3 with the meter bar 35B, so that this circuit will be metered on the meter B. It also shows strap 44A connecting the meter bars 35A and 35B, so that the circuit terminals laterally adjacent to the meter bar 35A can also be metered on the same circuit by using corresponding horizontal straps between the terminals on the meter bar 35A and the adjacent terminals of the consumption circuits 1 and 2. So also, the circuit 4 could readily be included in the same meter circuit by bridging from its terminal to the lower terminal on the meter bar 35B.

Figure 11:
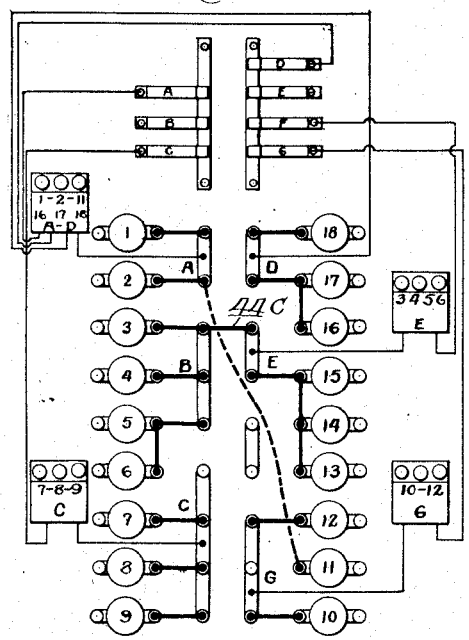
Fig. 11 is a similar diagrammatic view of a panel board having eighteen consumption circuits connected with certain groupings to four meters and with all except one of the connections made by means of the standardized strap connectors for which my panel board is specially adapted.

Connections can also be made directly between adjacent consumption circuit terminals in the same row, as shown between the terminals 13, 14 and 15 in Fig. 11. Likewise, connections can be made between consumption circuit terminals in one row and those in the other row by using a strap connector for bridging across the gap between two laterally adjacent meter bars, after the manner of the strap 44C of Figs. 10 and 11. My panel board construction therefore lends itself to a wide variety of possible combinations without requiring any crossing of conductors for the more common connections, and without requiring any waste of length in the conductors such as is involved with the crossed grid panel board constructions heretofore in use or with panel boards in which the connections are made indirectly through transfer bars disposed at the sides of the board. So also, since the strap connections are exposed on the front of the panel board and since the consumption circuits commonly connected to the two opposite polarities are at opposite sides of the board, a glance at the connected panel board will show which circuits are on each leg of the system, thus making it easy for the user to maintain a fair balance in the connections, particularly as he can cross-connect between circuits at opposite sides of the board if desired, as for example after the manner shown at the bottom of Fig. 10 or at the middle of Fig. 11.

By thus separating the consumption circuits which would ordinarily be connected respectively to the two polarity lines of the supply circuit, I also reduce the risk of short circuits during the making of changes in the connections. Moreover, the double grouping enables me to employ a smaller size area of panel board for a given number of circuits than would be required for the same if these circuit terminals were all grouped in single rows after the manner heretofore customary, while the mounting of both fuses for each consumption terminal laterally adjacent to each other on the panel board likewise reduces the required space.

Figure 12:
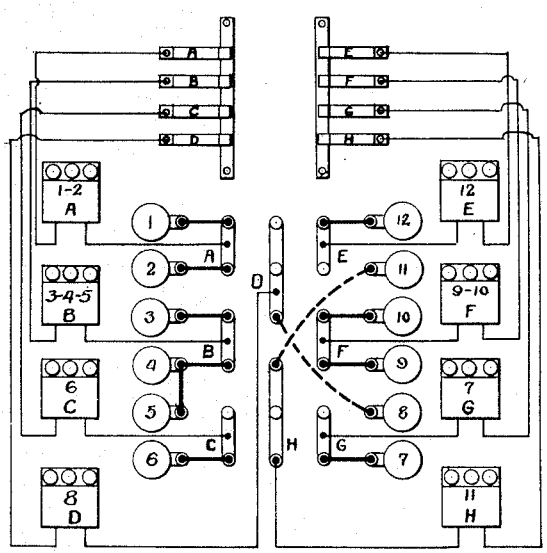
Fig. 12 is a diagrammatic view of a twelve circuit panel board used in connection with eight meters and having the meter straps arranged in three parallel rows.

However, I do not wish to be limited to the use of the standardized length of meter bars and strap connectors, nor to connections made entirely on the front of the panel board, nor otherwise to the various features of construction and arrangement as heretofore described it being obvious that the same might be varied in many ways without departing from the spirit of my invention. For example, unusual cases may arise where it is desirable to make connections which cannot readily be effected by the standardized strap arrangement. To allow for these, I preferably provide the panel board with rows of holes 47 disposed respectively between each row of consumption circuit terminals and the adjacent row of meter bars. Then I provide suitable connectors such as the rear circuit terminals 48 each of which comprises a strap portion adapted to reach from one of the consumption circuit terminals 34 to the adjacent perforation 47 and also has a tubular stem adapted to extend into the said perforation. By using two such rear circuit terminals and connecting them by an insulating wire disposed at the back of the board I can readily make rear connections between consumption circuit or meter strip terminals as shown by the wire 49 in Figs. 3 and 4, and as also indicated by the wires shown in dotted lines in Figs. 11 and 12. To provide access to the rear of the panel board for making such unusual connections, I desirably mount the panel board 21 between a pair of side panels 50 as shown in Fig. 2, so that by removing the panels 50 the electrician can reach back of the panel board for making such connections. To avoid confusion, the mechanical supports for the panels 21 and 50 are not shown in Fig. 2, these being too well understood by those to whom this patent is addressed to require illustrating.

Figure 13:
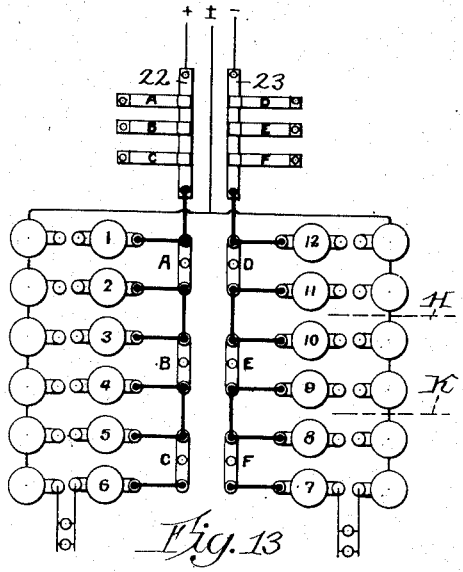
Fig. 13 is a diagrammatic view of the panel board of Fig. 3, showing the standardized strap connectors as used when all twelve of the consumption circuits are to be used without separately metering the same.

Moreover, I do not wish to be limited to the use of standardized meter bars, as these bars might be varied in length after the manner of the lower two bars in Fig. 11 and of the middle bar in the left hand row in the same figure. Nor do I wish to be limited to the use of only two rows of meter bars, as the principles of my invention may also be employed advantageously with a larger number of rows, such as the three rows of meter bars of Fig. 12. Furthermore, the panel board of my invention need not be restricted in use to applications where the separate circuits are to be metered, but can readily be used after the manner of an ordinary panel board for connecting consumption circuits which do not require a separate metering. For example, Fig. 13 shows how the twelve consumption circuits of a panel board arranged as per Fig. 3 can readily be connected in two groups to the polarity wires of the supply circuit by using the standardized straps for connecting each row of meter bars both to the bus bar alined with the same and to the consumption circuit terminals on the same side of the board.

Figure 1:
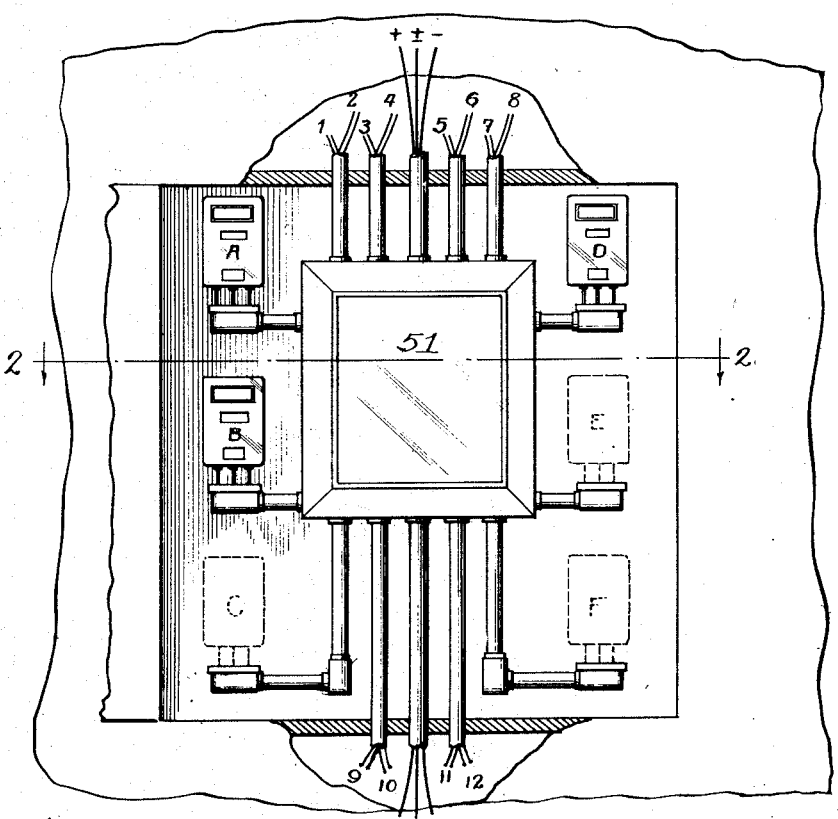

In installing a metering panel board of this type, I desirably mount the panel board in a cabinet 51 into which both the supply circuit wires and the consumption circuit wires are run through suitable conduits after the manner shown in Figs. 1 and 2, and desirably mount the various meters in the same closet with the cabinet 51. By so doing, it will be evident from the drawings (in which similar numerals have been applied to the fuse plugs and to the room circuit wires controlled by the same) that I entirely avoid all loose and unsightly wires both in the permanent connection to the panel board and meters and in the interchangeable connections which can readily be made according to my invention.

Moreover, by reducing the length of connectors required for affording a wide range of interchangeable grouping I considerably reduce the first cost over that of panel boards as heretofore constructed for the same capacity, while the greater compactness correspondingly decreases the required space.

Since the greater compactness reduces the size of the insulating board required for the panel, this also cooperates with the reduction in the total length of required connectors in reducing the cost of the panel boards, so that I can effect a decided saving in cost over older types of panel boards of the same capacity. Moreover, my parallel row arrangement readily lends itself to a sectional panel board construction which will permit contractors to carry the constituent sections in stock and to join them as needed in any desired sizes. For instance, it will be evident from Figs. 1 and 13 that the insulating board of the panel could be built in sections separated along the lines H and K, and that by increasing the number of the lower sections the capacity of the panel board can be correspondingly enlarged. In this case each of the lower sections would have two meter bars and two groups of fuse plugs mounted on it, and the only connection required between the sections would be that between the consumption side fuse plugs and the neutral bus bar, which is easily made after the customary manner of lengthening bus bars.

I claim as my invention:—

1. A metering panel board comprising a plurality of panels, each having upon its face a plurality of meter bars arranged in parallel rows between two rows of consumption circuit terminals, and detachable strap connectors of equal length connecting meter bars of one panel and of adjacent panels with each other and with the consumption circuit terminals.

2. A metering panel board comprising a plurality of panels, each having upon its face two parallel rows of consumption circuit terminals, meter terminal bars disposed in parallel rows and between the aforesaid rows, detachable straps for connecting meter terminal bars in adjacent rows, and detachable straps for connecting meter terminal bars with consumption circuit terminals and with adjacent meter terminal bars.

3. A metering panel board having upon its face two parallel rows of consumption circuit terminals, the terminals in one row being of opposite polarity to those in the other row, meter bars disposed upon the face of the board in a row between the said rows, and detachable connectors for connecting meter bars of one panel to each other and to meter bars of adjacent panels and to consumption circuit terminals.

4. A metering panel board having upon its face two parallel rows of consumption circuit terminals, the terminals in one row being of opposite polarity to those in the other row, meter bars disposed in two parallel rows upon the face of the board between the said rows of terminals, and detachable straps of uniform length for interchangeably connecting meter bars of either row either with those of the other row, or with adjacent circuit terminals.

5. A metering panel board, comprising consumption terminals disposed in two parallel rows and meter bars disposed in two parallel rows between the aforesaid rows, the said terminals and bars being provided with fastening elements and being disposed for providing a standardized spacing between the fastening elements on adjacent consumption terminals in the same row, the fastening elements on adjacent meter bars and between adjacent fastening elements on any consumption terminal and a meter bar adjacent thereto; and standardized straps for connecting such uniformly spaced fastening elements.

6. A metering panel board, comprising two parallel rows of consumption circuit terminals, and meter bars disposed in two parallel rows between the aforesaid rows; in combination with straps for interconnecting selected meter bars, and for interconnecting selected consumption circuit terminals, and for interconnecting selected meter bars and consumption circuit terminals, the connecting portions of the meter bars and of the said terminals being so spaced as to permit the use of straps of a single standard length for the said interconnecting.

7. A metering panel board, comprising two parallel rows of consumption circuit terminals, and meter bars disposed in two parallel rows between the said rows; in combination with straps for interconnecting selected meter bars, selected consumption circuit terminals, and selected meter bars and consumption circuit terminals; each meter bar having a strap-engaging portion disposed for simultaneous connection to straps respectively connecting the same with another meter bar and with a consumption circuit terminal.

8. A metering panel board, comprising two parallel rows of consumption circuit terminals, and meter bars disposed in parallel rows between the said rows; in combination with straps for interconnecting selected meter bars, selected consumption circuit terminals, selected meter bars and consumption circuit terminals; each meter bar having a strap-engaging portion disposed for simultaneous connection to straps respectively connecting the same with another meter bar in the same row and with a meter bar in another row.

9. A metering panel board, comprising two parallel rows of consumption circuit terminals of similar polarity, and meter bars disposed in parallel rows between the said rows; in combination with straps for interconnecting selected meter bars, selected consumption circuit terminals, and selected meter bars and consumption circuit terminals, each consumption circuit terminal having its strap-engaging portion disposed for simultaneous connection to straps respectively connecting the same with another circuit terminal and with a meter bar.

10. A metering panel board for a three wire circuit comprising two parallel rows of longitudinally spaced meter bars, two rows of consumption circuit elements at opposite sides of the said two parallel rows and extending parallel thereto, the consumption circuit elements in each row extending transversely of the said rows and each comprising the two fuse plugs associated with a single consumption circuit and a circuit terminal exposed between the two fuse plugs and the rows of meter bars; and detachable connectors for interconnecting adjacent circuit terminals, adjacent meter bars, and adjacent circuit terminals and meter bars.

11. A metering panel board for a three wire circuit comprising two parallel rows of longitudinally spaced meter bars, two rows of consumption circuit elements respectively at opposite sides of the meter bars and extending parallel thereto, the consumption circuit elements in each row extending transversely of the said rows and each comprising the two fuse plugs associated with a single consumption circuit and a circuit terminal exposed between the two fuse plugs and the rows of meter bars; and a neutral bus bar connected to the laterally outward fuse of each set of consumption circuit elements, the companion fuse being connected to the circuit terminal of the same set.

12. A metering panel board having two spaced rows of consumption circuit terminals, meter terminals disposed in two parallel rows between the aforesaid rows, two polarity bus bars respectively alined with the rows of meter terminals, two neutral bus bars respectively flanking the rows of consumption circuit terminals, and pairs of consumption circuit fuse plugs disposed respectively between the first named rows and the neutral bus bars, the fuse plugs of each pair being connected to each other through a consumption circuit and connected respectively to one of the circuit terminals and one of the neutral bus bars.

13. A metering panel board having two spaced rows of consumption circuit terminals, spaced meter terminals disposed in two parallel rows between the aforesaid rows, two polarity bus bars respectively alined with the rows of meter terminals, two neutral bus bars respectively flanking the rows of consumption circuit terminals, and pairs of consumption circuit fuse plugs disposed respectively between the first named rows and the neutral bus bars, the fuse plugs of each pair being connected to each other through a consumption circuit and connected respectively to one of the circuit terminals and one of the neutral bus bars, the neutral bus bars being disposed behind the panel of the board and connected respectively to the laterally outward consumption circuit fuse plug.

14. A metering panel board comprising consumption circuit terminals arranged in two parallel rows spaced from each other by three times the standard distance between the consecutive terminals in each row, and meter terminals disposed in two parallel rows respectively spaced from each other and from the said rows of circuit terminals by the said standard distance.

15. A metering panel board comprising consumption circuit terminals arranged in two parallel rows, meter terminals disposed in two parallel rows between the said rows of consumption circuit terminals, the panel of the board having rows of perforations respectively disposed between each row of meter terminals and the adjacent row of consumption circuit terminals; connectors for use on the front of the board in bridging from one meter terminal to another, from one consumption circuit terminal to another, and from a meter terminal to a consumption circuit terminal; and wire terminals each adapted to connect a consumption circuit terminal with a wire disposed at the rear of the board so as to afford a rear connection between any two of the aforesaid terminals.

16. In a metering panel board, protective instrumentality groups arranged in two rows flanking two rows of relatively spaced and alined meter bars, each said group comprising devices for protecting both sides of a consumption circuit, a neutral supply conductor connected to the laterally outward members of all of the said groups, connecting means interchangeably attachable for connecting the laterally inward member of any group with an adjacent meter bar or with another such member, and connecting means interchangeably attachable for connecting meter bars with one another, all of the said connecting means being arranged for attachment upon the front of the panel board without crossing any conductors disposed on the said front.

17. A sectional metering panel board, comprising board sections each having a pair of parallel meter bars flanked by two pairs of fusible consumption-circuit control devices extending laterally outward away from the two meter bars, the spacing of the said devices on each section being identical and the center lines of the said pairs of control devices being respectively spaced from the upper and lower edges on each section by half the connection distance between each meter bar and the adjacent control devices.

18. A sectional metering panel board, comprising board sections each having a pair of parallel meter bars flanked by two pairs of fusible consumption-circuit control devices extending laterally outward away from the meter bars, the spacing of the said devices on each section being identical, the meter bars on each section having terminals spaced respectively from the upper and lower edges of the section by half the connection distance between each meter bar and the adjacent control devices.

19. A sectional metering panel board, comprising board sections each having a pair of parallel meter bars flanked by two pairs of fusible consumption-circuit control devices extending laterally outward away from the meter bars, the spacing of the said devices on each section being identical, and a single companion section carrying bus bars spaced laterally of the section to correspond to the spacing between the meter bars.

20. A sectional metering panel board, comprising board sections each having a pair of parallel meter bars flanked by two pairs of fusible consumption-circuit control devices extending laterally outward away from the meter bars, the spacing of the said devices on each section being identical, and a single companion section carrying bus bars spaced laterally of the section to correspond to the spacing between the meter bars, the said bus bars and the meter bars having terminals each spaced from the adjacent horizontal edge of the section carrying the same by half the connection distance between each meter bar and the adjacent control devices.

21. A metering panel board comprising a plurality of panels each having upon its face two parallel rows of consumption circuit terminals, a meter bar disposed between the aforesaid rows and detachable connectors for connecting meter terminal bars with consumption circuit terminals and with meter terminal bars of adjacent panels.

22. A sectional metering panel board comprising board sections each having upon its face a pair of parallel meter bars provided with connector attaching terminals and flanked by pairs of fusible consumption-circuit control devices having connector attaching terminals and extending laterally outward away from the meter bars and arranged in rows parallel to the meter bars, the spacing of the said terminals on each section and the terminals of adjacent sections when in assembled relation being identical.

Signed at Chicago, April 30th, 1921.

ARTHUR C. McWILLIAMS.